May 3, 1932.  E. ADEL  1,856,063
LUBRICATING SYSTEM
Filed June 12, 1929   2 Sheets-Sheet 2

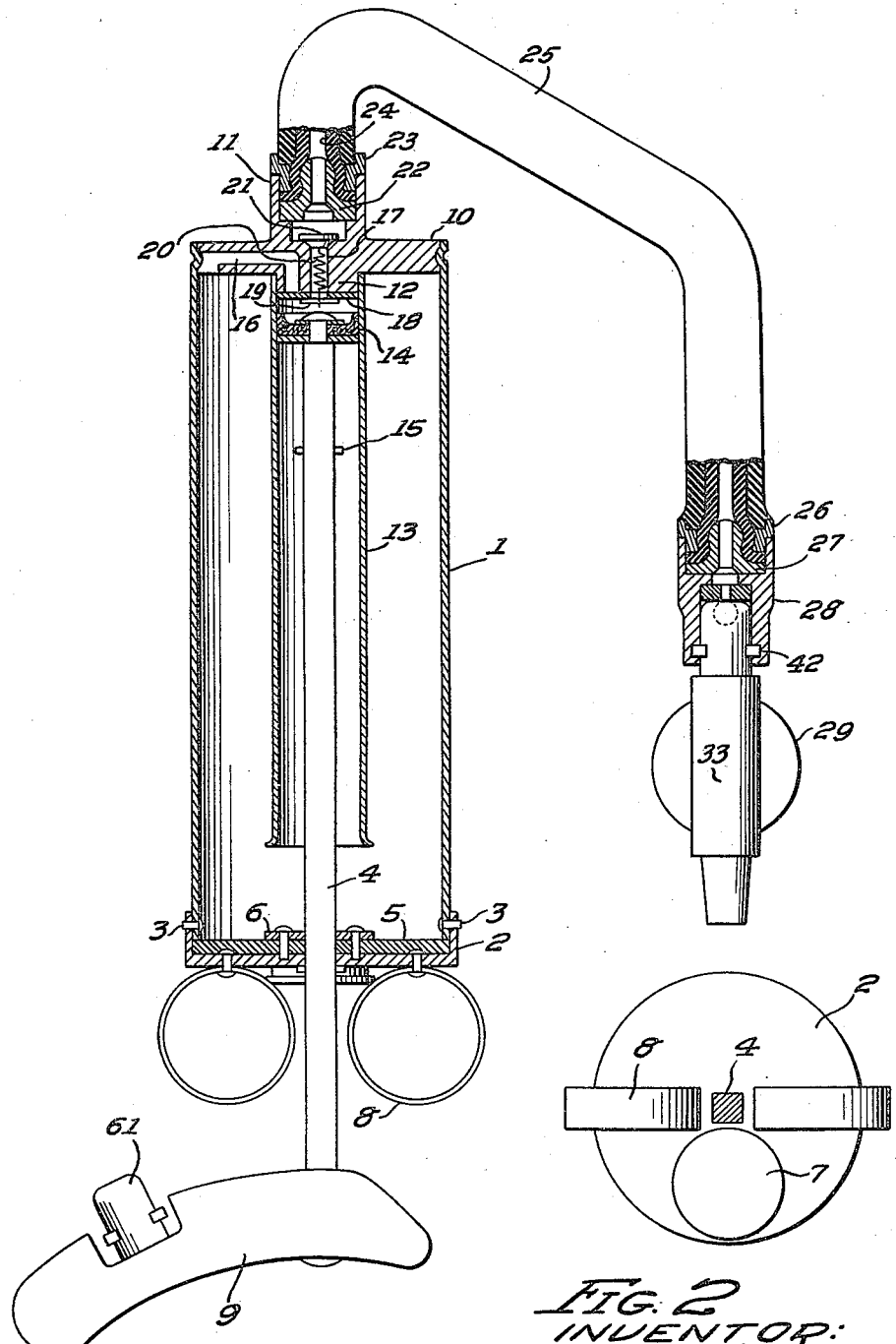

INVENTOR:
E. Adel
BY H.J. Sanders
ATTORNEY

Patented May 3, 1932

1,856,063

UNITED STATES PATENT OFFICE

EMIL ADEL, OF CHICAGO, ILLINOIS

LUBRICATING SYSTEM

Application filed June 12, 1929. Serial No. 370,403.

This invention relates to improvements in lubricating systems and its object primarily is to provide such a system adapted for application to vehicles, to motors of all kinds, to power transmission mechanism, to farm machinery and in fact to metal surfaces generally that are exposed to the weather, to friction, to dust, dirt or the like.

The most general application of the lubrication system will be to motor vehicles wherein it will supply a source of constant and dependable lubrication that to a great degree is automatic in its application. More specifically the invention consists in the combination and arrangement of parts to be hereinafter fully described, pointed out in the claims and illustrated in the accompanying drawings which form a part of this application for patent and in which—

Fig. 1 is a view in elevation and partly in section of the lubricating mechanism.

Fig. 2 is a bottom plan view of the oil gun portion of the mechanism, the handle being shown in section.

Like reference characters denote corresponding parts throughout the several views.

Figure 3:
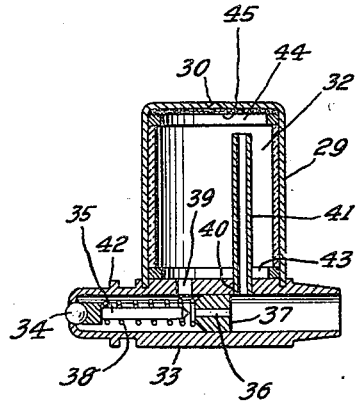
Fig. 3 is a vertical sectional view through the oil cup employed.

The present lubricating system comprises oil cups that are dust proof in construction and that feed oil automatically, the cups being filled by means of an especially constructed oil gun which is also dust proof, the gun being of very simple mechanical construction and operable by one hand. The oil cups are provided with air filters to prevent the entrance of dust.

The oil gun comprises a cylindrical container 1 to one end of which the top 2 is secured by means of the usual bayonet couplings 3, said top having a central perforation for passage of the plunger or piston rod 4. Received inside the top 2 and secured thereto is the leather gasket 5 and secured thereto is the stop washer 6, said members 5 and 6 also being formed centrally with a perforation to permit passage of the said plunger. The top 2 is formed to one side of its central perforation with a relatively large perforation normally closed by the screw cap 7 which is removed to permit filling of the container. Finger rings 8 secured to the top 2 may be engaged by the fingers of the operator while he grasps the handle 9 at the outer end of the piston rod to permit manipulation of said rod.

Fixed in the forward end of the container 1 is the head 10 formed with the integral contracted tubular extension 11 and with the inwardly extending contracted portion 12 about which one end of the cylinder 13 is securely fitted, said cylinder extending longitudinally and centrally of the container 1 and being of substantially less diameter than the same, the end of said cylinder 13 remote from the head 10 being open. The plunger rod 4 extends into the cylinder 13 and at its inner end is provided with the piston 14, a stop pin 15 extending through the rod 4 being adapted, as the rod moves outwardly, for contact with the stop washer 6 to prevent accidental withdrawal of the piston from the cylinder.

An angular by-pass 16 in the head 10 connects the interior of the cylinder 13 with the container 1 and a passageway 17 connects the interior of the cylinder 13 with that of the extension 11, a valve 18 within the cylinder 13 yieldingly closing one end of the by-pass 16 and extending completely across said cylinder and being formed with a perforation in line with one end of the passageway 17, a pin 19 spanning the perforation in said valve being connected by the contractile spring 20 that extends through said passageway 17 to the check valve 21 at the opposite end of said passageway.

Figure 4:
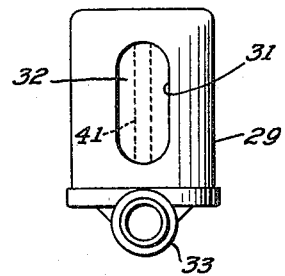
Fig. 4 is a view of Fig. 3 in front elevation.
Figure 5:
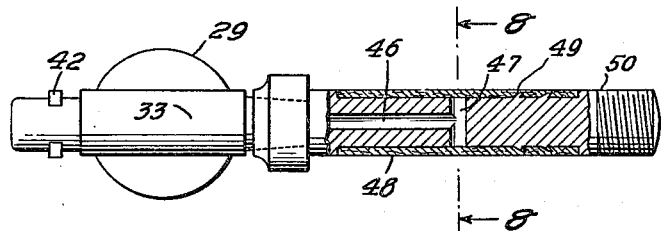
Fig. 5 is a fragmentary view of the mechanism illustrating its application to a shackle bolt which is shown in section.

Seated in the extension 11 are the connections 22, 23 for the rubber hose 24 and the flexible hose 25 which members at their outer ends are connected by similar connections 26, 27 to the head 28. Two types of oil cup are shown and used in the present lubricating system. One is of the type shown in Figs. 3, 4 and 5 and the other of the type shown in Fig. 6. The type shown in Figs. 3, 4 and 5 is particularly for use in lubricating shackle bolts and the spring leaves of the vehicle and comprises the inverted cup 29 provided with the air hole 30 and formed with diametrically opposed windows 31 and housing the cylindrical glass pane 32, said member 29 being mounted to the tubular plug or fitting 33 which is open at one end, the opposite end being closed except for a small perforation normally closed by the ball valve 34 mounted to the stem 35 disposed within the fitting, said stem remote from the ball forming a needle valve adapted yieldingly to close the passageway 36 in the block 37 disposed approximately centrally of the fitting 33. A spring 38 encircling the stem 35 yieldingly retains the same in the described normal position.

The fitting is formed upon opposite sides of the block 37 with the perforations 39, 40, the former opening into the cup member 29 and the perforation 40 snugly receiving one end of the air pipe 41 that extends into the cup, said fitting being formed with the lugs 42 common to oil bearing fittings to permit application thereto of an oil gun. Referring again to the pane 32 the same rests upon a gasket 43 and receives a gasket 44 upon which rests a felt, or the like, air filter 45 that filters dust from the air coming through the air hole 30.

The fitting 33 is adapted for application to that type of shackle bolt 50 shown in Fig. 5 which bolt is formed with a longitudinal central oil channel 46, intercommunicating transverse oil channel 47 and an oil distributing jacket 48 of felt or the like secured in position by spurs 49 struck from the bolt. When oil is fed into the channel 46 from one end of the bolt it flows into the channel 47 and into the jacket 48 and is spread thereby and seeps into the leaves of the springs, oiling them.

Figure 6:
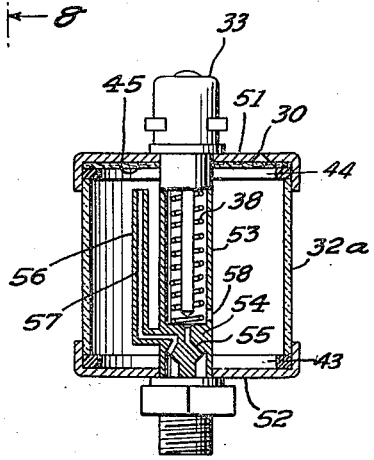
Fig. 6 is a vertical sectional view through another form of oil cup employed.
Figure 8:
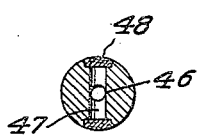
Fig. 8 is a cross sectional view taken on the line 8—8 of Fig. 5.

The oil cup shown in Fig. 6 comprises the top and bottom portions 51, 52, the top having the air hole 30 and the glass cylinder 32a carried thereby and provided with the gaskets 43, 44 and filter 45. This cup has a fitting 33 and a vertical central hollow stem 53 formed with the partition 54 having the oil passage 55 communicating with the upper portion of the stem and connecting it with the lower portion, the cup being screwed into the bearing in the usual manner. An air pipe 56 branches off from the stem 53 and communicates by means of the passageway 57 with the lower portion of the stem.

The oil gun is filled by removing the cap 7, the oil passing into the container 1 and wholly or partially filling the same. To fill a cup from the gun the plunger 4 is reciprocated by means of its handle 9. The outward stroke of the plunger will draw oil through the by-pass 16 and, raising the valve 18 through suction, into the cylinder 13. The inward stroke of the plunger will close the valve 18 but the oil will be forced through the perforation therein and through the passageway 17, forcing the valve 21 off its seat, into the rubber hose and through the same into a fitting 33. In the case of the cups of the type shown in Fig. 3 the needle valve 35 will close the passage 36 and the oil will pass through the perforation 39 into the cup 29 and glass cylinder. Air will be exhausted through the air pipe 41 and if the cup is filled above the level of this pipe the oil will flow through the same and out through the open end of the fitting into and about the shackle bolt and spring leaves. When the oil gun is disconnected the spring 38 will unseat the needle valve and the oil in the cup will flow back through the opening 39 and through the passageway 36 and out through the open end of the fitting to the shackle bolt. In the case of the type of cup shown in Fig. 6 the pressure from the oil gun will cause the needle valve to close the passageway 55 but the oil will flow out through the perforation 58 into the cup filling the same, air being expelled by the pipe 56. Finally the spirng 38 will unseat the needle valve and the oil will flow back through the perforation 58 into the stem and out through the passageway 55 into the bearing.

Figure 7:
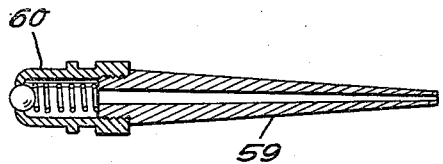
Fig. 7 is a sectional view of a spraying nozzle that may be employed for flushing or for spraying with kerosene or gasoline.

In Fig. 7 a spray nozzle 59 is shown which may be provided with a fitting 60 which may be attached to the oil gun when the same is filled with kerosene or gasoline and the bearings flushed. When the oil gun is not in use it may be secured to the fitting 61 carried by the handle and in this position the open end of the gun will be kept free from dirt and dust and leakage or seepage of oil therefrom will be prevented.

What is claimed is:—

1. In a lubricating system, a perforated fitting, a block in said fitting formed with a passageway, means movably arranged in said fitting to one side of said block for opening and closing said block passageway and one end perforation in said fitting one at a time, a cup carried by said fitting and communicating therewith through a fitting perforation, an air pipe carried by said fitting and extending into said cup, said air pipe opening into said fitting upon the opposite side of said block with respect to a perforation in said fitting, and an air filter for said cup.

2. In a lubricating system, a perforated fitting, a block in said fitting formed with a passageway, means movable in said fitting disposed at one side of said block for opening said block passageway and closing one end perforation in said fitting while in one position and for opening said end perforation and closing said block passageway while in another position, said means including a yielding resilient positioning element, a cup carried by said fitting and communicating therewith through a fitting perforation, an air pipe carried by said fitting and extending into said cup, said air pipe opening into said fitting upon the opposite side of said block with respect to said last named perforation, and an air filter for said cup.

3. In a lubricating system, a perforated fitting, a block in said fitting formed with a passageway, a stem in said fitting movable longitudinally thereof, said stem terminating in a needle valve for closing said block passageway in one position of said stem, a ball valve mounted to said stem for closing one end perforation in said fitting in another position of said stem, a spring upon said stem for actuating the same and yieldingly closing said ball valve and opening said needle valve, a cup carried by said fitting and communicating therewith through a perforation in said fitting, an air pipe carried by said fitting and extending into said cup, said air pipe opening into said fitting upon the opposite side of said valved block with respect to a perforation in said fitting, and an air filter for said cup.

In testimony that I claim the foregoing as my own I have hereto affixed my signature.

EMIL ADEL.